(12) United States Patent
Yoshinari

(10) Patent No.: US 6,789,978 B1
(45) Date of Patent: Sep. 14, 2004

(54) SHEET FIXING DEVICE

(75) Inventor: Hirota Yoshinari, Urawa (JP)

(73) Assignee: Toto Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,715

(22) Filed: May 12, 2000

(30) Foreign Application Priority Data

Sep. 16, 1999 (JP) .............................. 11-007086
Feb. 25, 2000 (JP) ...................... 2000-049846

(51) Int. Cl.⁷ ............................... E04B 1/00
(52) U.S. Cl. ......................... 403/381; 160/380; 52/63; 52/122; 47/26
(58) Field of Search ................... 52/63, 222, 135; 160/380, 392, 395; 47/26, 65.5, 29, 31; 403/381

(56) References Cited

U.S. PATENT DOCUMENTS

| 2,164,414 A | * | 7/1939 | Long |
| 3,384,938 A | * | 5/1968 | O'Connor |
| 3,792,510 A | * | 2/1974 | Evett |
| 3,893,212 A | * | 7/1975 | Curry |
| 3,930,344 A | * | 1/1976 | Gahler |
| 4,103,401 A | * | 8/1978 | Conley |
| 4,267,876 A | * | 5/1981 | Bloomfield |
| 4,341,255 A | * | 7/1982 | Mock |
| 4,619,094 A | * | 10/1986 | Yang |
| 4,638,532 A | * | 1/1987 | Yang et al. |
| 4,665,670 A | * | 5/1987 | Van den Burg |
| 4,694,543 A | * | 9/1987 | Conley |
| 4,697,326 A | * | 10/1987 | Faircloth |
| 4,726,411 A | * | 2/1988 | Conley |
| 4,926,605 A | * | 5/1990 | Milliken et al. |
| 5,209,029 A | * | 5/1993 | Foerst |
| 5,242,004 A | * | 9/1993 | Stilling |
| 5,596,843 A | * | 1/1997 | Watson |
| 5,794,400 A | * | 8/1998 | Fisher et al. |
| 5,819,836 A | * | 10/1998 | Keil |

FOREIGN PATENT DOCUMENTS

| JP | 1-108922 | * | 4/1989 |
| JP | 6-153707 | * | 6/1994 |

* cited by examiner

Primary Examiner—John R. Cottingham
Assistant Examiner—Lynne H. Browne
(74) Attorney, Agent, or Firm—McGlew and Tuttle, P.C.

(57) ABSTRACT

A sheet fixing device comprises an elongated support frame 1 having a narrow opening portion, a pressing frame 3 fitted in the elongated support frame 1 to hold a sheet 2 grippingly in cooperation with the elongated support frame, and an urging member 6 fitted in the pressing frame 3 to urge the pressing frame against an inner wall of the elongated support frame 1. The pressing frame 3 is prevented from being bent or warped.

3 Claims, 11 Drawing Sheets

SHEET FIXING DEVICE

BACKGROUND OF THE INVENTION

The present invention relates to a sheet fixing device for fixing a light transmitting sheet to the framework of a vinyl house used as a greenhouse.

A sheet fixing device used in a vinyl house as a greenhouse usually comprises an elongated support frame having a narrow opening portion and an elastic retaining linear member fitted in the support frame, with a vinyl sheet being pressed and fixed into the support frame by using the retaining linear member.

On the other hand, sheet fixing devices capable of fixing a soft thin film about 0.1 mm thick satisfactorily in a greenhouse are disclosed, for example, in Japanese Utility Model Publication No. 54-42992 and Utility Model Registration No. 2094628.

The sheet fixing devices disclosed in the above publications each comprise an elongated support frame having a narrow opening portion, a dividable pressing frame fitted in the elongated support frame to hold a sheet grippingly in cooperation with the elongated support frame, and an urging member fitted in the pressing frame to urge the pressing frame against an inner wall of the elongated support frame. Centrally in the bottom of the pressing frame is formed a straight perforated line in the longitudinal direction or a notch which meanders in the longitudinal direction.

According to each of the above fixing devices, when a sheet is fitted into the elongated support frame through the pressing frame and the pressing frame is pressed to both sides with the urging member, the pressing frame holds the sheet grippingly in cooperation with the elongated support frame while being divided in two right and left through the perforated line or the notch, whereby wrinkling of the sheet can be prevented. Besides, since the pressing frame is present between the sheet and the urging member, that is, since the urging member does not contact the sheet directly, it is possible to prevent the sheet from being damaged by the urging member, or the rupture of the sheet caused by rubbing can be prevented.

However, in the sheet fixing device disclosed in Japanese Utility Model Publication No. 54-42992 in which a perforated line is formed in the pressing frame, the pressing frame becomes no longer employable once it is cut along the perforated line, and thus the said device is less economical. Moreover, when an attempt is made to push the sheet into the elongated support frame through the pressing frame, the tension of the sheet, in other words, a self-reverting force of the sheet acting to return to a horizontal state, is exerted on the back of the pressing frame, resulting in that the pressing frame may be bent inwards or warp in the opposite direction, with the perforated line as the center. Since the sheet fixing work is performed while suppressing such a motion, the working efficiency is inferior.

Further, for dividing the pressing frame along the perforated line, it is necessary to use an urging member having a strong resilience or a strong urging force, thus resulting in marked deterioration of the working efficiency, and the machining of the associated component becomes difficult. In view of this point, if the pressing frame is formed by molding a material which permits easy cutting along a perforated line, for example, a thin plastic material, the pressing frame will be overcome by the urging force of the urging member and be deformed partially or wholly, with wrinkling of the sheet. Besides, the pressing frame is apt to be deteriorated and is inferior in durability.

On the other hand, according to the sheet fixing device disclosed in Japanese Utility Model Registration No. 2094628 which uses a pressing frame with a meandering notch formed centrally, bending or warping of the pressing frame is somewhat remedied, but the operation for re-utilizing the pressing frame at the time of sheet replacement is extremely troublesome. More particularly, when the pressing frame is urged by the urging member at the time of fixing a sheet, it is divided in two right and left and is separated from each other. In the replacement of sheet, therefore, when the bisected pressing frame portions are taken out each independently from the inside of the elongated support frame and when an attempt is made to sandwich the sheet with the pressing frame portions after fitting a new sheet into the support frame, it is required to fit the right and left pressing frame portions one by one into the elongated support frame while making alignment of cut-in faces. At this time, the tension from the sheet is exerted on the back of each pressing frame portion and therefore it is necessary to perform the frame fitting operation while making the alignment against the said tension. Thus, the pressing frame mounting operation is very troublesome, causing deterioration of the working efficiency.

In the foregoing Japanese Utility Model Registration No. 2094628 there also is disclosed a technique such that the bottom of a pressing frame is expanded in an expander fashion through a plurality of notches. According to this technique, however, once the pressing frame is expanded laterally by an urging member, it can no longer revert to its original position by its self-reverting force and remains expanded. Therefore, when the pressing frame is used again at the time of sheet replacement, the work for taking out the pressing frame from the inside of the elongated support frame is troublesome, and also when fitting the pressing frame again into the support frame, its loading work is troublesome because of a too large width thereof.

SUMMARY OF THE INVENTION

It is an object of the present invention to provide a sheet fixing device for use in a vinyl house, capable of preventing wrinkling and breakage of a sheet, permitting the use of an urging member having a weak urging force, capable of being re-used repeatedly at the time of sheet replacement, and capable of remarkably improving the work for installing and removing a pressing frame.

For achieving the above-mentioned object, according to the present invention, in one aspect thereof, there is provided a sheet fixing device comprising an elongated support frame having a narrow opening portion, the elongated support frame comprising a horizontal bottom portion and both side wall portions rising respectively from both side ends of the bottom portion, a pressing frame fitted in the elongated support frame to hold a sheet grippingly in cooperation with the elongated support frame, and an urging member fitted in the pressing frame to urge the pressing frame against an inner wall of the elongated support frame, wherein the pressing frame comprises a central support plate, guide slots formed longitudinally in both side positions of the support plate, and a pair of right and left retaining frames having horizontal bottom portions fitted transversely slidably into the guide slots respectively.

According to the present invention, in another aspect thereof, there is provided a sheet fixing device comprising an elongated support frame having a narrow opening portion, the elongated support frame comprising a horizontal bottom portion and both side wall portions rising respectively from both side ends of the bottom portion, a pressing frame fitted in the elongated support frame to hold a sheet grippingly in cooperation with the elongated support frame, and an urging member fitted in the pressing frame to urge the pressing frame against an inner wall of the elongated support frame, wherein the pressing frame comprises a central support plate, a pair of right and left retaining frames disposed respectively on both sides of the support plate in a transversely slidable manner, and guide slots formed longitudinally in horizontal bottom portions of the retaining frames respectively, both side end portions of the support plate being fitted respectively into the guide slots.

According to the present invention, in a further aspect thereof, there is provided a sheet fixing device comprising an elongated support frame having a narrow opening portion, the elongated support frame comprising a horizontal bottom portion and both side wall portions rising respectively from both side ends of the bottom portion, a pressing frame fitted in the elongated support frame to hold a sheet grippingly in cooperation with the elongated support frame, and an urging member fitted in the pressing frame to urge the pressing frame against an inner wall of the elongated support frame, wherein the pressing frame comprises a pair of right and left retaining frames disposed in a transversely slidable manner and a guide slot formed longitudinally in a horizontal bottom portion of one of the retaining frames, and a horizontal bottom portion of the other retaining frame is fitted in the said guide slot.

According to the present invention, in a still further aspect thereof, there is provided a sheet fixing device comprising an elongated support frame having a narrow opening portion, the elongated support frame comprising a horizontal bottom portion and both side wall portions rising respectively from both side ends of the bottom portion, a pressing frame fitted in the elongated support frame to hold a sheet grippingly in cooperation with the elongated support frame, and an urging member fitted in the pressing frame to urge the pressing frame against an inner wall of the elongated support frame, wherein the pressing frame comprises a pair of right and left retaining frames disposed in a transversely slidable manner and guide slots formed longitudinally in horizontal bottom portions of the retaining frames respectively, the horizontal bottom portions of the retaining frames being fitted together slidably through the guide slots.

According to the present invention, in a still further aspect thereof, there is provided a sheet fixing device comprising an elongated support frame having a narrow opening portion, the elongated support frame comprising a horizontal bottom portion and both side wall portions rising respectively from both side ends of the bottom portion, a pressing frame fitted in the elongated support frame to hold a sheet grippingly in cooperation with the elongated support frame, and an urging member fitted in the pressing frame to urge the pressing frame against an inner wall of the elongated support frame, wherein the pressing frame comprises a pair of right and left retaining frames formed at the same angle as the both side wall portions of the elongated support frame and in a transversely slidable manner, bottom frames integrally contiguous respectively to base ends of the retaining frames inclinedly upward or downward at a predetermined angle, and a guide slot formed longitudinally in at least one of the bottom frames, the other bottom frame being slidably fitted in the guide slot.

According to the present invention, in a still further aspect thereof, there is provided a sheet fixing device comprising an elongated support frame having a narrow opening portion, the elongated support frame comprising a horizontal bottom portion and both side wall portions rising respectively from both side ends of the bottom portion, a pressing frame fitted in the elongated support frame to hold a sheet grippingly in cooperation with the elongated support frame, and an urging member fitted in the pressing frame to urge the pressing frame against an inner wall of the elongated support frame, wherein the pressing frame comprises a central support plate, guide slots formed longitudinally in both side positions of the support plate, a pair of right and left retaining frames formed on both sides of the support plate at the same angle as the both side wall portions of the elongated support frame and in a transversely slidable manner, and bottom frames integrally contiguous respectively to base ends of the retaining frames inclinedly upward or downward at a predetermined angle, the bottom frames being slidably fitted in the guide slots respectively.

According to the present invention, in a still further aspect thereof, there is provided a sheet fixing device comprising an elongated support frame having a narrow opening portion, the elongated support frame comprising a horizontal bottom portion and both side wall portions rising from both side ends of the bottom portion, a pressing frame fitted in the elongated support frame to hold a sheet grippingly in cooperation with the elongated support frame, and an urging member fitted in the pressing frame to urge the pressing frame against an inner wall of the elongated support frame, wherein the pressing frame comprises a central, horizontal support plate, a pair of right and left retaining frames formed on both sides of the horizontal support plate at the same angle as the both side wall portions of the elongated support frame and in a transversely slidable manner, bottom frames integrally contiguous respectively to base ends of the retaining frames inclinedly upward or downward at a predetermined angle, and guide slots formed longitudinally in the bottom frames respectively, both end portions of the horizontal support plate being fitted in the guide slots respectively.

DETAILED DESCRIPTION OF PREFERRED EMBODIMENTS

Embodiments of the present invention will be described hereinafter with reference to the accompanying drawings.

Figure 1:
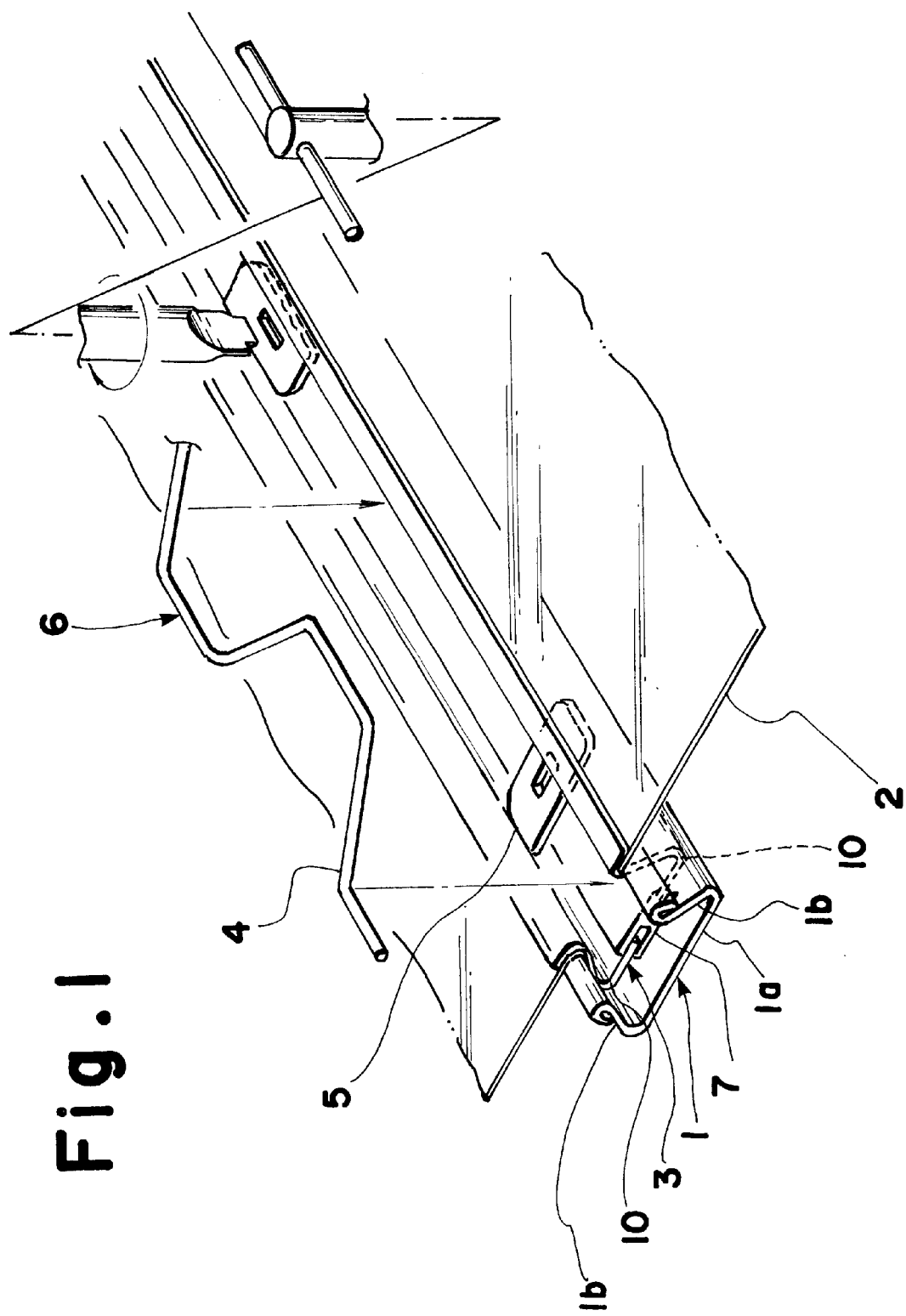
FIG. 1 is a perspective view of a sheet fixing device according to an embodiment of the present invention.
Figure 2:
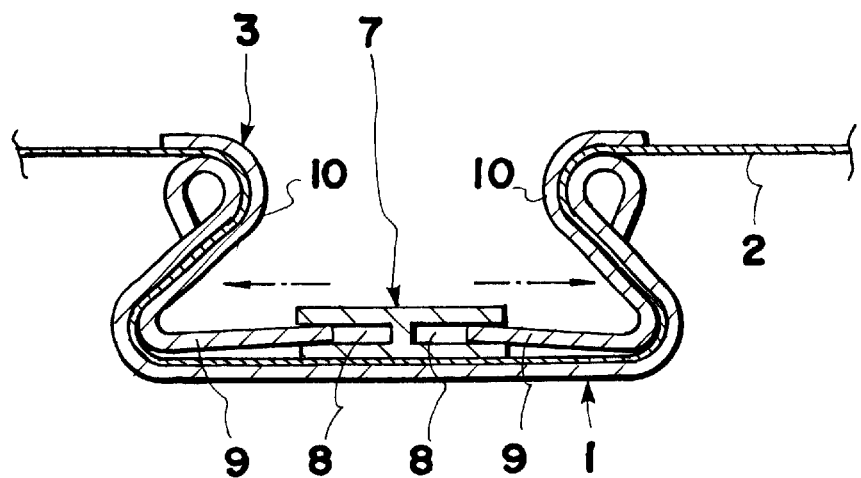
FIG. 2 is a vertically sectional front view of FIG. 1.

FIGS. 1 and 2 illustrate a sheet fixing device according to an embodiment of the present invention.

This sheet fixing device is made up of an elongated support frame 1 having a narrow opening portion, the elongated support frame 1 comprising a horizontal bottom portion 1a and both side wall portions 1b comprising from both side ends of the bottom portion 1a, a pressing frame 3 fitted in the elongated support frame 1 to hold a synthetic resin sheet 2 grippingly in cooperation with the support frame 1, and an urging member 6 constituted by a retaining linear member 4 or a retaining plate member 5 which is fitted in the pressing frame 3 to urge the pressing frame against an inner wall of the elongated support frame 1. As the urging member 6, either the retaining linear member 4 or the retaining plate member 5 may be used alone in an independent manner or both may be used in combination.

The pressing frame 3 is made up of a central support plate 7 having an H-shaped section, a pair of right and left guide slots 8 formed longitudinally in both side positions of the support plate 7, and a pair of right and left retaining frames 10 having horizontal bottom portions 9 respectively which are fitted in the guide slots 8 respectively in a transversely slidable manner.

The elongated support frame 1, like the conventional one, is of a dovetail groove-shaped section, having pigeon tail-shaped grooves and upper-end curls. The retaining frames 10 are formed in a shape similar to the shape of the elongated support frame 1, also having pigeon tail-like grooves. The sheet 2 is sandwiched uniformly between the inner wall of the elongated support frame 1 and outer surfaces of both retaining frames 10, whereby the sheet is prevented from being wrinkled or ruptured.

The bottom portions 9 of the retaining frames 10 in the pressing frame 3 are kept inserted into the guide slots 8 of the support plate 7, whereby the two retaining frames 10 can be maintained smaller in width than the width of the bottom portion of the elongated support frame 1. In this state the pressing frame 3 is conveyed, stored, or loaded into the elongated support frame 1.

More specifically, for fixing the sheet 2, first the sheet is pushed into the elongated support frame 1 through the pressing frame 3. With the retaining frames 10 held in a compressed state, the pressing frame 3 is fitted into the elongated support frame 1 obliquely from the opening portion of the elongated support frame. In this state, for example if the retaining linear member 4 is fitted into the pressing frame forcibly against its own resilience, the retaining linear member 4 presses the retaining frames 10 in the directions of arrows in FIG. 2, so that the retaining frames 10 slide horizontally while being guided by the guide slots 8 and are abutted against the inner wall of the elongated support frame 1. As a result, the sheet 2 is sandwiched between the retaining frames 10 and the elongated support frame 1 and does not come out.

On the other hand, at the time of sheet replacement, the retaining linear member is removed and the retaining frames 10 are pushed inwards with fingers for example, whereby the retaining frames 10 slide inwards along the guide slots 8, so that the pressing frame 3, in a reduced state of its width, can be taken out from the elongated support frame 1. During the installing or removing operation for the pressing frame 3, since the support plate 7 is located centrally, the retaining frames 10 are prevented from being bent or warped by abutment thereof with the support plate.

Figure 3:
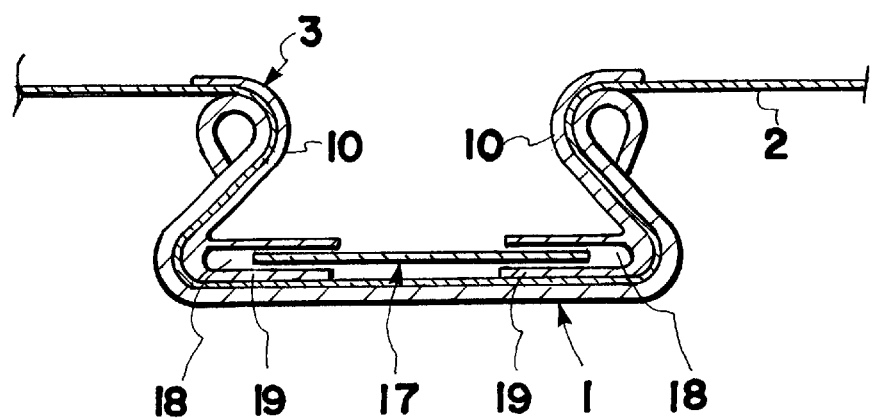
FIG. 3 is a vertically sectional front view of a sheet fixing device according to another embodiment of the present invention.

FIG. 3 illustrates a sheet fixing device according to another embodiment of the present invention, which uses a modified pressing frame 3. The pressing frame 3 is made up of a central support plate 17, a pair of right and left retaining frames 10, and guide slots 18 formed longitudinally in bottom portions 19 of the retaining frames 10. Both end portions of the support plate 17 are fitted into the guide slots 18 respectively.

While the pressing frame 3 is not used, the retaining frames 10 are allowed to slide in their compression directions along the support plate 17 to reduce the width of the pressing frame, and when the pressing frame 3 is to be used, the retaining frames 10 are allowed to slide toward the elongated support frame 1 by, for example, the retaining linear member 4 to hold the sheet 2 grippingly. Other structural and functional points, as well as effects obtained, are the same as in the embodiment illustrated in FIG. 1.

Figure 4:
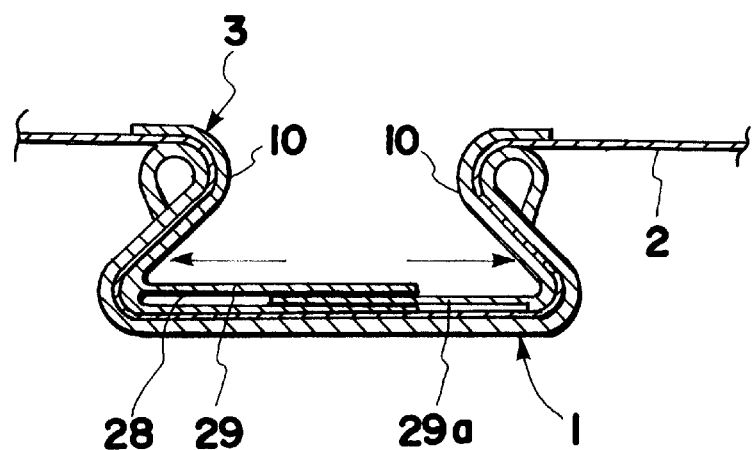
FIG. 4 is a vertically sectional front view of a sheet fixing device according to a further embodiment of the present invention.

FIG. 4 illustrates a sheet fixing device according to a further embodiment of the present invention, which also uses a modified pressing frame 3. The pressing frame 3 is made up of a pair of right and left retaining frames 10 disposed in a transversely slidable manner and a guide slot 28 formed longitudinally in a horizontal bottom portion 29 of one retaining frame 10, i.e., the left-hand retaining frame 10 in FIG. 3, with a bottom portion 29a of the other retaining frame 10 being inserted slidably into the guide slot 28. While the pressing frame 3 is not used, the bottom portion 29a of the right-hand retaining frame 10 is inserted into the guide slot 28 to reduce the width of the entire pressing frame, and when the pressing frame 3 is to be used, the retaining frames 10 are pushed and allowed to slide right and left by the urging member 6 to hold the sheet 2 sandwich the sheet 2 between them and the elongated support frame 1. Other structural and functional points, as well as effects obtained, are the same as in the embodiments illustrated in FIGS. 1 and 3.

Figure 5:
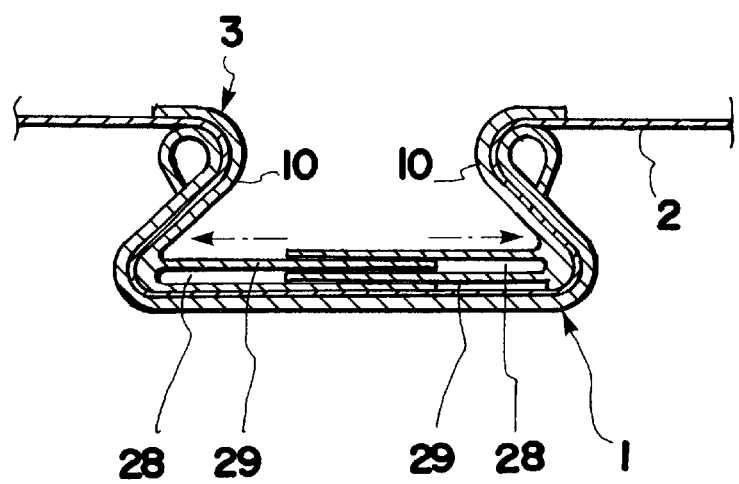
FIG. 5 is a vertically sectional front view of a sheet fixing device according to a still further embodiment of the present invention.

FIG. 5 illustrates a sheet fixing device according to a further embodiment of the present invention, which is a modification of the embodiment shown in FIG. 4. A pressing frame 3 is made up of retaining frames 10 and opposed guide slots 28 formed respectively in bottom portions 29 of the retaining frames. The bottom portions 29 are slidably fitted into the guide slots 28. Functions and effects are the same as in the embodiment illustrated in FIG. 4.

In each of the above embodiments the urging member is not specially limited insofar as it can urge the pressing frame 3 to both sides of the elongated support frame. For example, in addition to those described above, there also may be used a chevron-shaped or wavy plate spring or a highly resilient linear member.

Figure 6:
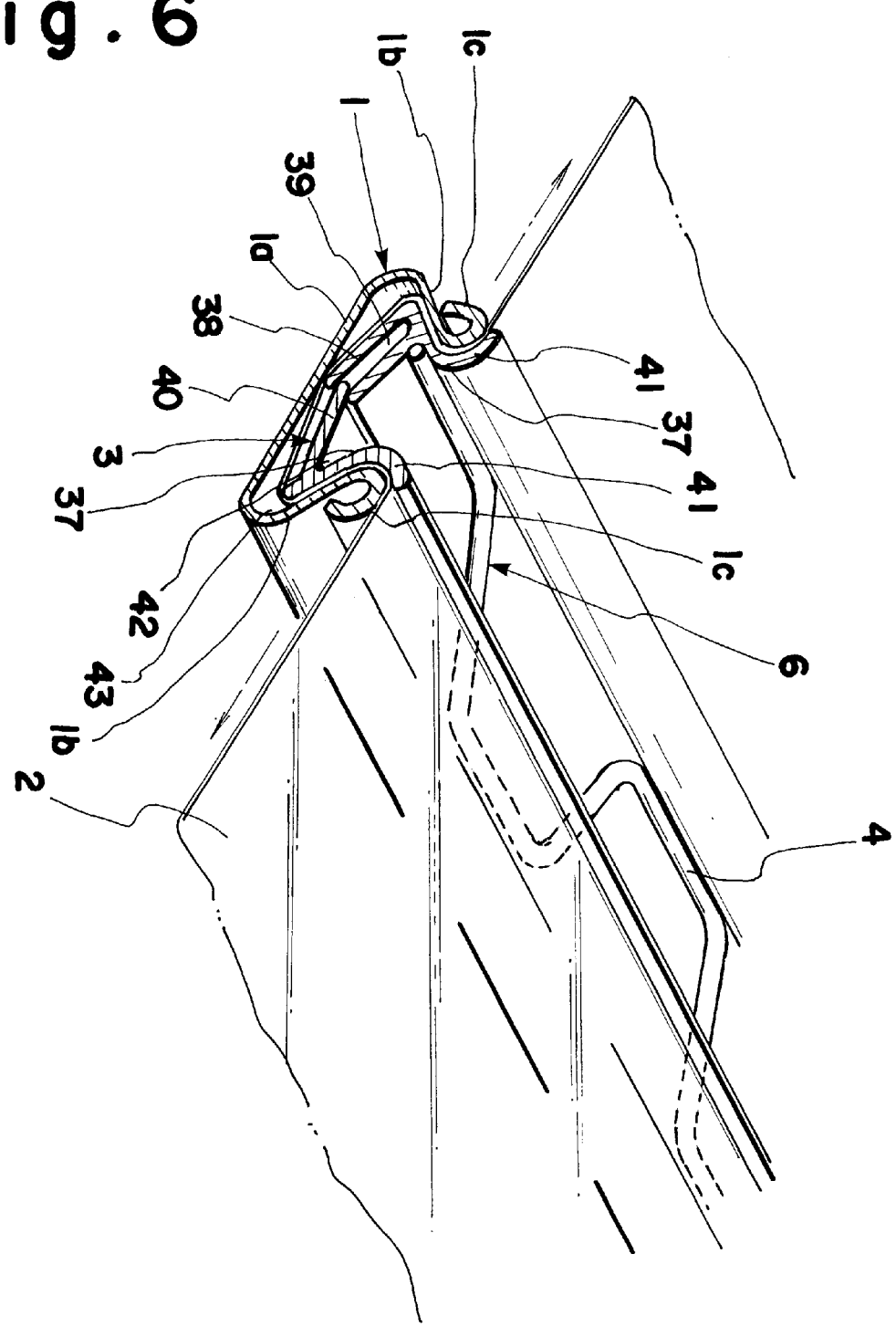
FIG. 6 is a perspective view showing a state of use of a sheet fixing device according to a still further embodiment of the present invention.
Figure 7:
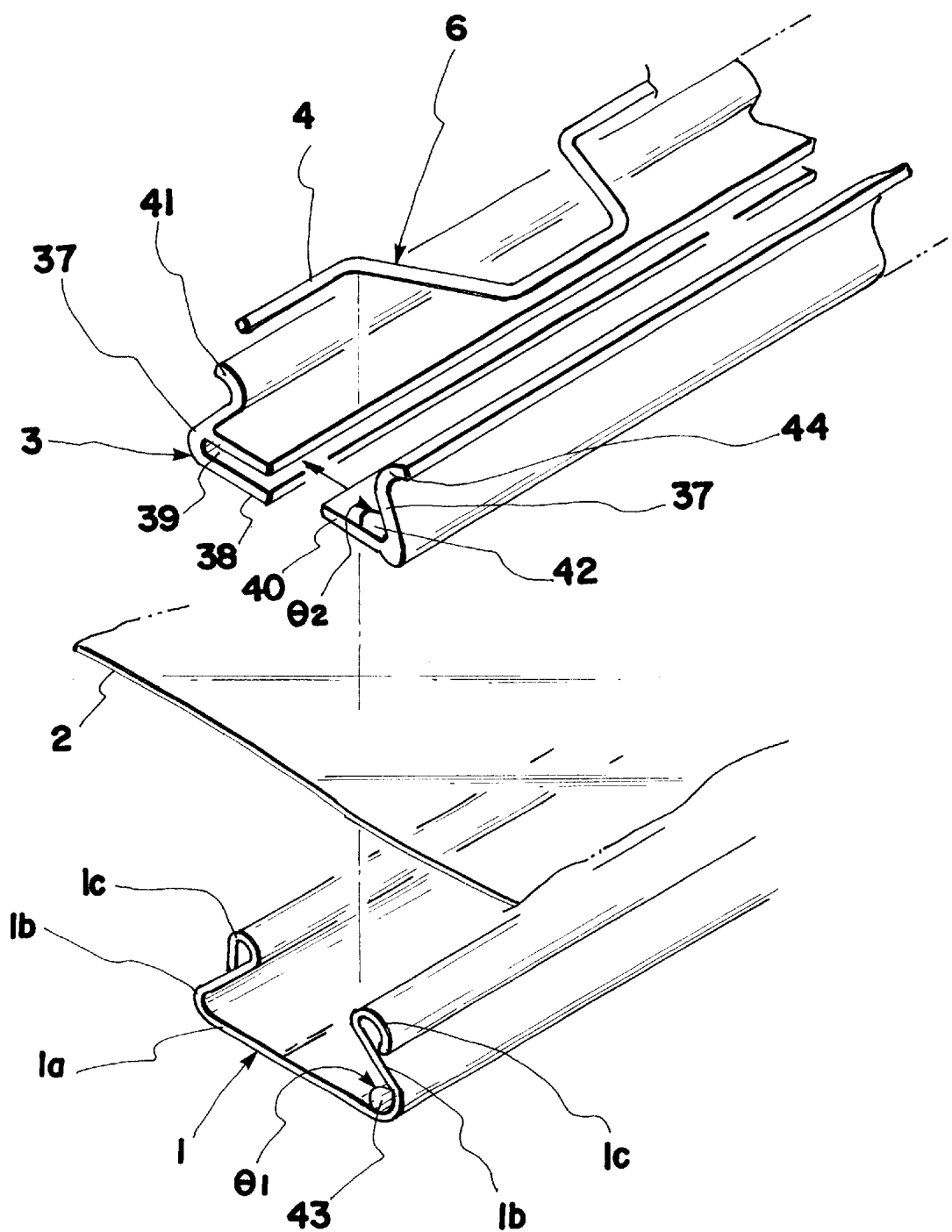
FIG. 7 is an exploded perspective view of FIG. 6.
Figure 8:
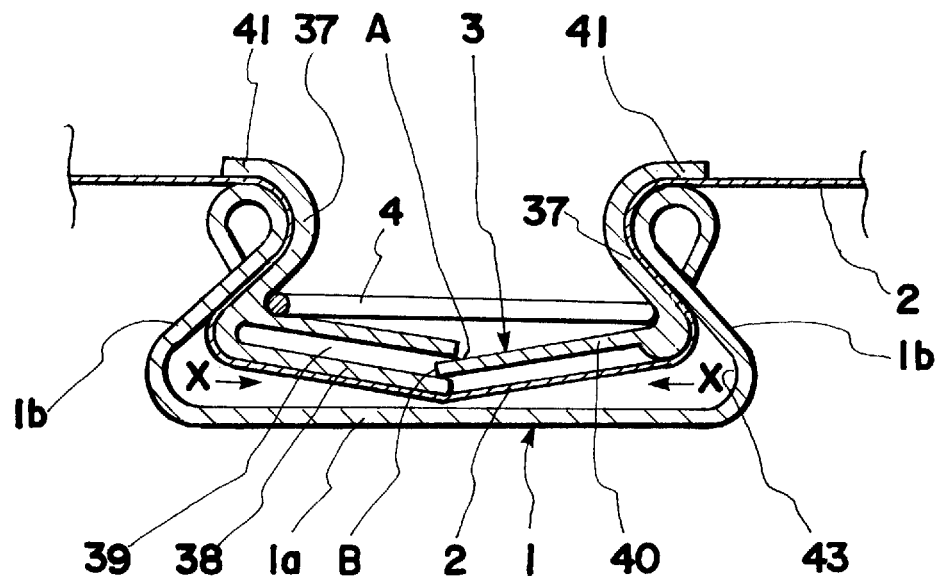
FIG. 8 is a vertically sectional, enlarged front view of FIG. 7.

FIGS. 6 to 8 illustrate a sheet fixing device according to a further embodiment of the present invention.

The sheet fixing device of this embodiment is made up of an elongated support frame 1 having an narrow opening portion, a pressing frame 3 fitted in the elongated support frame 1 to hold a synthetic resin sheet 2 grippingly in cooperation with the elongated support frame, and an urging member 6 which is a retaining linear member 4 or a retaining plate member fitted in the pressing frame 3 to urge the pressing frame 3 against an inner wall of the elongated support frame 1.

The elongated support frame 1, like the conventional one, is of a dovetail groove-shaped section, having pigeon tail-shaped grooves and comprising a horizontal bottom portion 1a, a pair of side wall portions 1b rising obliquely upwards from both ends of the bottom portion 1a, and upper-end curls 1c. The pressing frame 3 is formed in a shape similar to the shape of the elongated support frame 1, also having pigeon tail-like grooves. The sheet 2 is sandwiched uniformly between the inner wall of the elongated support frame and an outer surface of the pressing frame 3, whereby the sheet 2 is prevented from being wrinkled or ruptured.

The pressing frame 3 is made up of a pair of right and left retaining frames 37 disposed in a transversely slidable manner, a bottom frame 38 contiguous to a base end of one retaining frame 37, and a plate-like bottom frame 40 contiguous to a base end of the other retaining frame 37. The paired right and left retaining frames 37 are set at an angle equal or almost equal to the angle of both side walls 1b of the elongated support frame 1, with curls 41 as bent pieces being contiguous upward to the retaining frames 37.

The bottom frames 38 and 40 are integrally contiguous to the retaining frames 37 inclinedly downward at a predetermined angle so that the angle θ2 of a pigeon tail-like groove 42 formed by each retaining frame 37 and each bottom frame 38 (40) is larger than the angle θ1 of a pigeon tail-like groove 43 formed on the elongated support frame side.

A guide slot 39 is formed in one bottom frame 38 longitudinally and the other bottom frame 40 is normally inserted into the guide slot 39 in a transversely slidable manner. By so doing, the width between both-side retaining frames 37 is kept smaller than the width of the bottom portion 1a of the elongated support frame 1. In this state the pressing frame 3 is conveyed, stored, or installed into the elongated support frame 1.

For fixing the sheet 2, first the sheet is pushed into the elongated support frame 1 through the pressing frame 3. More particularly, in a compressed state of the retaining frames 37 the pressing frame 3 is fitted obliquely into the opening portion of the elongated support frame 1. In this state, for example the retaining linear member 4 is fitted into the pressing frame 3 forcibly against its own resilience, with the result that the retaining linear member 4 presses the retaining frames 37 in the transverse direction and the retaining frames 37 and the bottom frames 38, 40 thereby slide horizontally while being guided by the guide slot 39. The thus-sliding retaining frames 37 are brought into abutment against the inner wall of the elongated support frame 1. As a result, the sheet 2 is held grippingly by the retaining frames 37 and both side wall portions 1b of the elongated support frame 1 and no longer comes off.

On the other hand, for replacing the sheet 2, the retaining linear member is removed and the retaining frames 37 are pushed inwards with fingers for example, whereby the retaining frames 37 and the bottom frames 38, 40 slide inwards along the guide groove 39. Thus, the pressing frame 3, in a reduced state of its width, can be taken out from the elongated support frame 1.

It is to be noted that when the retaining frames 37 are expanded right and left by the retaining linear member 4, as shown in FIG. 8, an end portion of the other bottom frame 40 moves up to near an outlet end of the guide slot 39 and the retaining frames 37 come into abutment against both side wall portions 1b while holding the sheet 2 grippingly. At this time, the two bottom portions 38 and 40 of the pressing frame 3 tilt downward in a generally V shape, whereby the pressing frame 3 itself is prevented from being bent upward from its central position in an inverted V shape.

With the bottom frames 38 and 40 thus tilted in a generally V shape, even if an external force based on wind or rain and acting to compress the whole of the pressing frame 3 in the directions of arrows X in FIG. 8 is exerted on the retaining frames 37 and bottom frames 38, 40 from the sheet 2 side, this compressing force presses the retaining frames 37 obliquely inwards, so that the bottom frames 38 and 40 tilt at an angle at which a more acute V shape is formed. As a result, as shown in FIG. 8, an upper surface of an end portion of the other bottom frame 40 is caught on an outer edge A of the guide slot 39 and likewise a lower edge B of the end portion of the bottom frame 40 is caught on a lower surface of the guide slot 39 at an acute angle. Under this engaging action of the two edges A and B, the other bottom frame 40 does not enter the guide slot 39 and remains stretched outside the groove. In other words, in the transversely slid state of the pressing frame 3, the pressing frame, in cooperation with the elongated support frame 1, holds the sheet 2 grippingly in a uniform condition, and even if an external force is exerted on the sheet 2, the pressing frame 3 is not compressed and therefore the sheet 2 can be maintained in its uniformly sandwiched state. Besides, since the bottom frames 38 and 40 are kept in the V-stretched state, the elongated support frame 1 and the V-shaped pressing frame 3 combine into a rigid structure.

FIGS. 9 to 15 illustrate further embodiments of the present invention, in which the pressing frame 3 is provided with a non-slip mechanism or an engaging mechanism for preventing the other bottom frame 40 from moving back into the guide slot 39.

As is the case with the embodiment illustrated in FIG. 6, a sheet fixing device of each of these embodiments comprises an elongated support frame 1 having a narrow opening portion, a pressing frame 3 fitted in the elongated support frame 1 to hold a sheet 2 grippingly in cooperation with the elongated support frame 1, and an urging member 6 fitted in the pressing frame 3 to urge the pressing frame against an inner wall of the elongated support frame 1. The pressing frame 3 is composed of a pair of right and left retaining frames 37 disposed in a transversely slidable manner, bottom frames 38 and 40 integrally contiguous to base ends of the retaining frames 37 in a downwardly inclined state at a predetermined angle, and a guide slot 39 formed in one bottom frame 38 longitudinally. The other bottom frame 40 is slidably fitted into the guide slot 39. These points are common to all of the embodiments in question.

Figure 9:
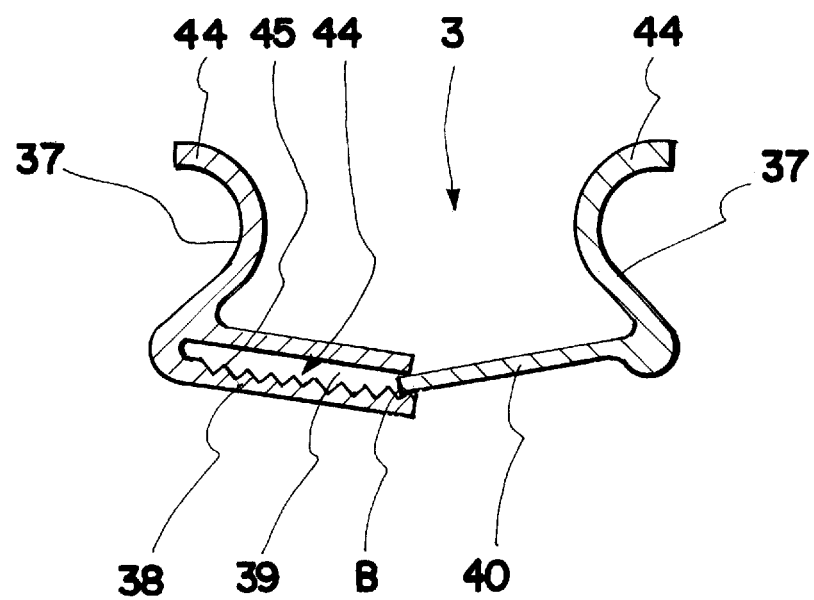
FIG. 9 is a vertically sectional front view of a pressing frame according to a still further embodiment of the present invention.

In the embodiment illustrated in FIG. 9, a large number of teeth 45 like saw teeth are formed on a lower surface of the guide slot 39, the teeth 45 serving as both a non-slip mechanism and an engaging mechanism, indicated at 44. A lower edge B of a front end of the other bottom frame 40 is brought into engagement with any, preferably one located on the front end side, of the teeth 45 to prevent the other bottom frame 40 from entering the guide slot 39.

Figure 10:
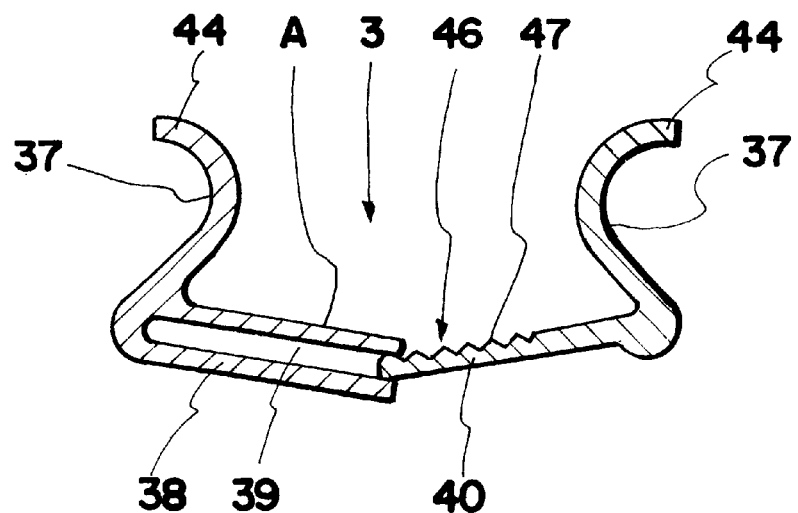
FIG. 10 is a vertically sectional front view of a pressing frame according to a still further embodiment of the present invention.

In the embodiment illustrated in FIG. 10, a large number to teeth 47 like saw teeth are formed on an upper surface of the other bottom frame 40, the teeth 47 serving as both a non-slip mechanism and an engaging mechanism, indicated at 46, and an edge A of an outlet end of the guide slot 39 is engaged with any of the teeth 47.

Figure 11:
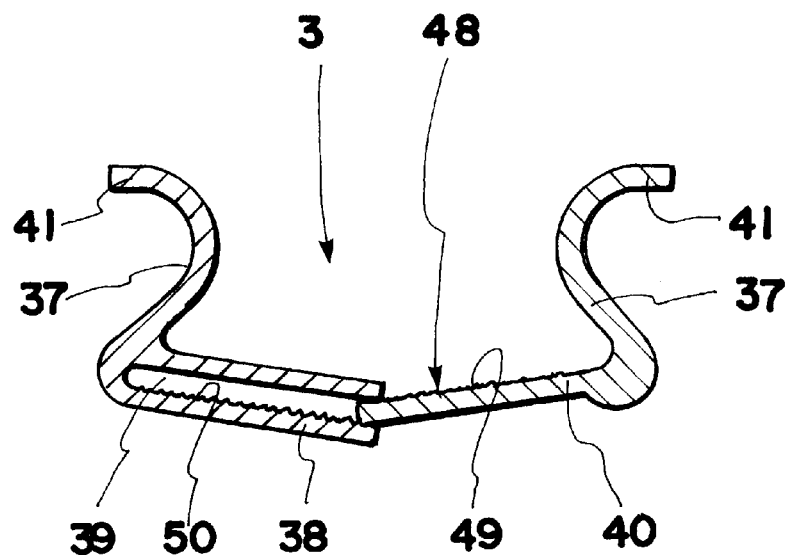
FIG. 11 is a vertically sectional front view of a pressing frame according to a still further embodiment of the present invention.

In the embodiment illustrated in FIG. 11, the upper surface of the other bottom frame 40 and the lower surface of the guide slot 39 are formed as rough uneven surfaces 49 and 50, respectively, thereby constituting a non-slip mechanism 48.

Figure 12:
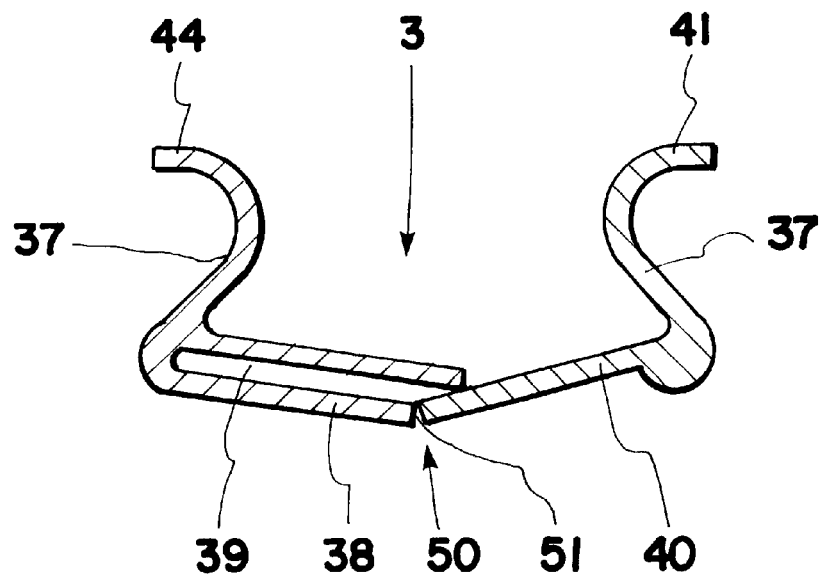
FIG. 12 is a vertically sectional front view of a pressing frame according to a still further embodiment of the present invention.

In the embodiment illustrated in FIG. 12, a lower portion of a front end of one bottom frame 38 is cut off and thereby shortened to form an engaging portion 51 of an engaging mechanism 50 and a front end of the other bottom frame 40 is brought into engagement with the engaging portion 51.

Figure 13:
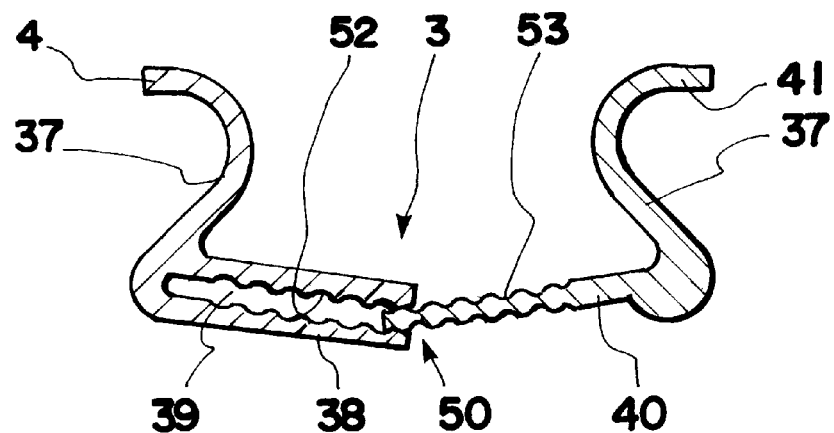
FIG. 13 is a vertically sectional front view of a pressing frame according to a still further embodiment of the present invention.

In the embodiment illustrated in FIG. 13, a large number of concaves 52 are formed as an engaging mechanism in upper and lower surfaces of the guide slots 39, while convexes 53 are formed on outer surfaces of the other bottom frame 40, and when the bottom frame 40 is pushed in the direction of compression, one convex 53 is fitted in one concave 52 to prevent a further movement of the bottom frame 40 in the compressive direction.

Figure 14:
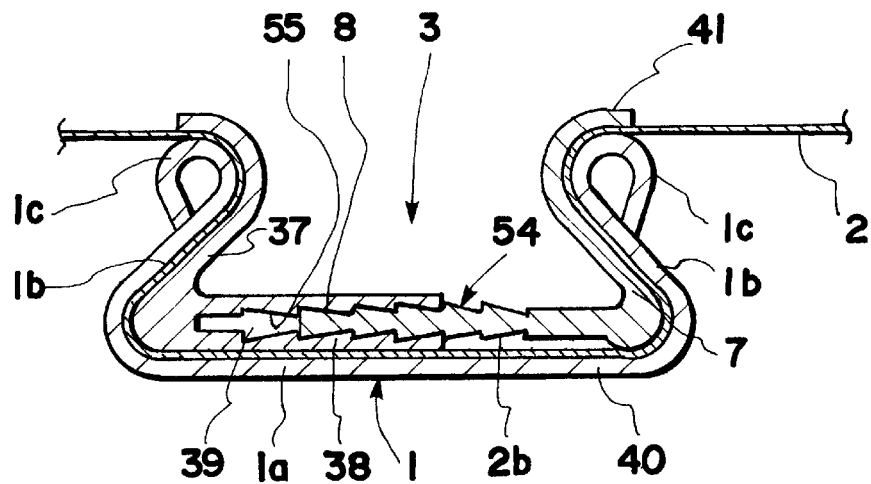
FIG. 14 is a vertically sectional front view of a sheet fixing device according to a still further embodiment of the present invention.

In the embodiment illustrated in FIG. 14, as an engaging mechanism 54, a large number of wedge-like recesses 55 are formed in both upper and lower surfaces of the guide slot 39 in one bottom frame 38, while wedge-like projections 56 are formed on outer surfaces of the other bottom frame 40, and when the other bottom frame 40 undergoes a force acting in the compressive direction, end faces of the projections 56 come into abutment against end faces of the recesses 55, or any of the projections 56 is abutted against an outer end face of one bottom frame 38, to prevent a further movement of the other bottom frame 40 in the compressive direction from the engaged position.

Although in this embodiment the both-side retaining frames 37 as constituents of the pressing frame 3 are formed at the same angle as both side wall portions 1b of the elongated support frame 1 and the bottom frames 38 and 40 are formed horizontally, the bottom frames 38 and 40 may be inclined downward.

Figure 15:
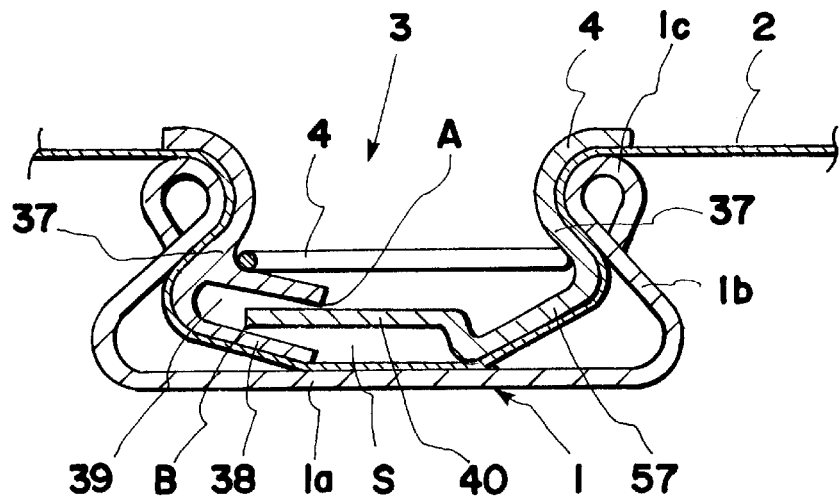
FIG. 15 is a vertically sectional front view of a sheet fixing device according to a still further embodiment of the present invention.

In the embodiment illustrated in FIG. 15, an inclined leg portion 57 is provided between the other bottom frame 40 and the associated retaining frame 37, the leg portion 57 being formed at an angle which permits edges A and B of end portions of the bottom frames 38 and 40 to be easily engaged with the other bottom frame 40, thereby preventing movement of the bottom frame 40 in the compressive direction. In this case, a relatively large space S is formed below the bottom frame 40, whereby, for example when machine screws of the like are driven centrally into the bottom portion 1a of the elongated support frame 1, it is possible to prevent interference of the bottom frame 40 with the screws.

Figure 16:
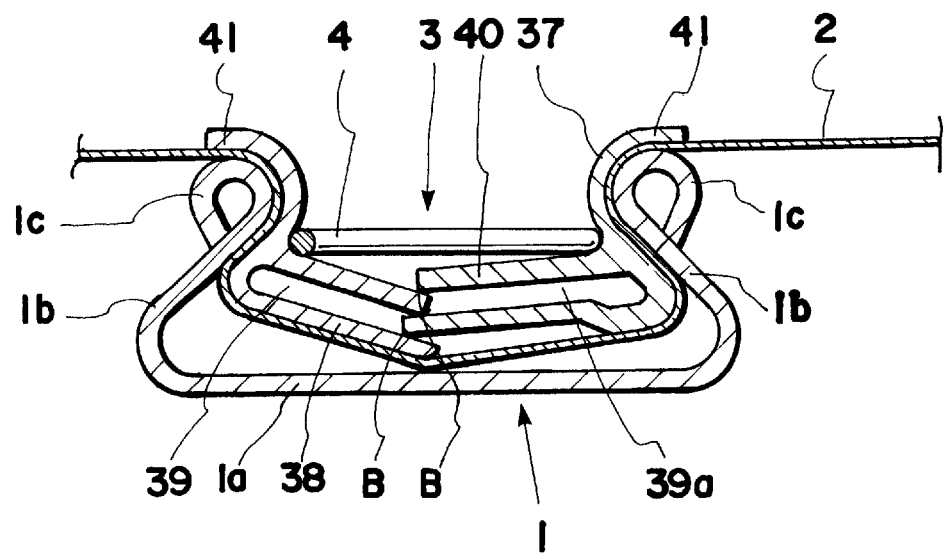
FIG. 16 is a vertically sectional front view of a sheet fixing device according to a still further embodiment of the present invention.

In the embodiment illustrated in FIG. 16, a guide slot 39a is formed also in the other bottom frame 40, and a pair of right and left bottom frames 38 and 40 are fitted together slidably through the respective guide slots 39 and 39a. As an engaging mechanism, two upper and lower edges B are formed at a front end of the other bottom frame 40. The edges B are brought into engagement with an upper surface of one bottom frame 38 and a lower surface of the guide slot 39 obliquely so as to bite in both surfaces. Therefore, even if the pressing frame 3 is pushed in the compressive direction by the sheet 2, compression of the pressing frame is prevented with a bracing force of the edges B.

Figure 17:
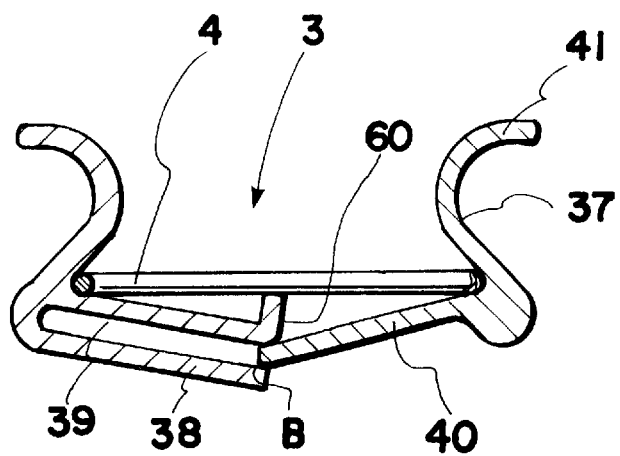
FIG. 17 is a vertically sectional front view of a pressing frame according to a still further embodiment of the present invention.

The embodiment illustrated in FIG. 17 is substantially the same as the embodiment illustrated in FIG. 6. But in this embodiment a stopper 60 is erected on an end portion of one bottom frame 38 and is brought into contact with the retaining linear member 4 as the urging member 6. When the pressing frame 3 undergoes a compressing force, not only the edge B at an end portion of the bottom frame 40 is brought into engagement obliquely with the lower surface of the guide slot 39 as in the embodiment of FIG. 6, but also the stopper 60 is abutted against the retaining linear member 4 to prevent more strongly an upward floating of the bottom frames 38 and 40. The structure using the stopper 60 is also applicable to all of the sheet fixing devices described above in connection with the other embodiments of FIGS. 8 to 16.

Figure 18:
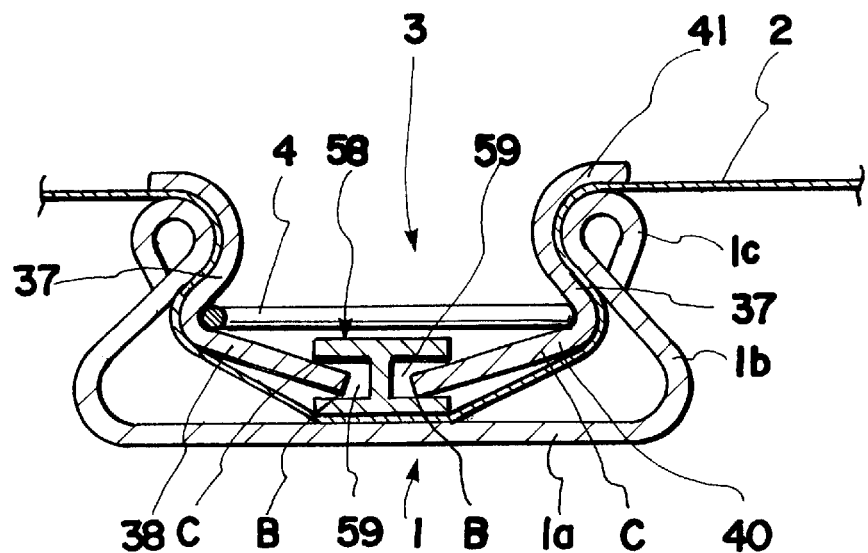
FIG. 18 is a vertically sectional front view of a sheet fixing device according to a still further embodiment of the present invention.

FIG. 18 illustrates a sheet fixing device according to a still further embodiment of the present invention.

The sheet fixing device of this embodiment, like the one illustrated in FIG. 6, is composed of an elongated support frame 1 having a narrow opening portion, a pressing frame 3 fitted in the elongated support frame 1 to hold a sheet 2 grippingly in cooperation with the elongated support frame, and an urging member 6 fitted in the pressing frame 3 to urge the pressing frame against an inner wall of the elongated support frame. The pressing frame 3 is composed of a central support plate 58, a pair of guide slots 59 longitudinally in both side positions of the support plate 58, a pair of right and left retaining frames 37 disposed on both sides of the support plate 58 in a transversely slidable manner, and bottom frames 38 and 40 integrally contiguous to base ends of the retaining frames 37 respectively in a downwardly inclined state at a predetermined angle, the bottom frames 38 and 40 being slidably fitted into the guide slots 59 respectively.

In this embodiment, since the support plate 58 is disposed centrally, the paired bottom frames 38 and 40 are prevented from floating upward even when the right and left retaining frames 37 are pushed in the direction of compression. Further, edges B of end portions of the bottom frames 38 and 40 are caught on lower surfaces of the guide slots 59 and edges C of end portions of the guide slots 59 are caught on upper surfaces of the bottom frames 38 and 40 to prevent movement of the bottom frames in the compressing direction.

Figure 19:
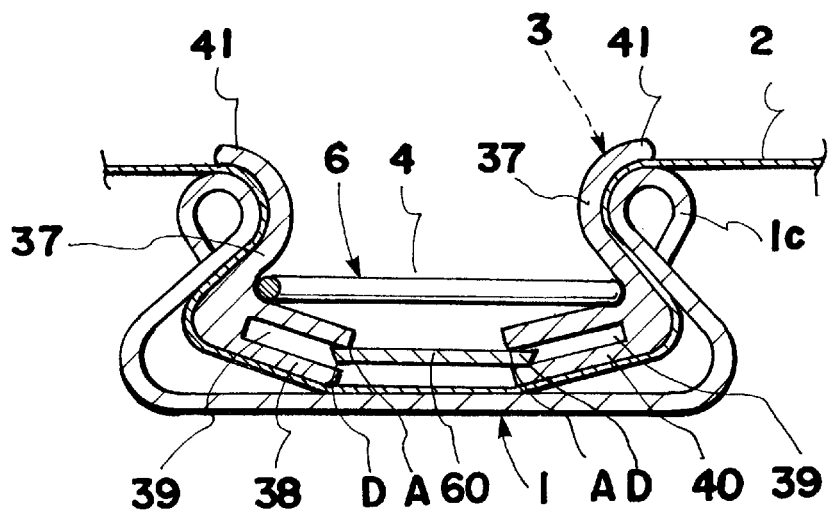
FIG. 19 is a vertically sectional front view of a sheet fixing device according to a still further embodiment of the present invention.

FIG. 19 illustrates a sheet fixing device according to a still further embodiment of the present invention.

As is the case with the embodiment of FIG. 6, the sheet fixing device of this embodiment is composed of an elongated support frame 1 having a narrow opening portion, a pressing frame 3 fitted in the elongated support frame 1 to hold a sheet 2 grippingly in cooperation with the elongated support frame, and an urging member 6 fitted in the pressing frame 3 to urge the pressing frame against an inner wall of the elongated support frame 1. The pressing frame 3 is made up of a central, horizontal support plate 60, a pair of right and left retaining frames 37 disposed on both sides of the horizontal support plate 60 in a transversely slidable manner, bottom frames 38 and 40 integrally contiguous respectively to base ends of the retaining frames 37 in a downwardly inclined state at a predetermined angle, and guide slots 39 formed respectively in the bottom frames 38 and 40 in the longitudinal direction. Both end portions of the horizontal support plate 60 are fitted in the guide slots 39 respectively.

In this embodiment, like the embodiment of FIG. 18, the paired bottoms frames 38 and 40 are prevented from floating upward because the horizontal support plate 60 is disposed centrally. When the retaining frames 37 and the bottom frames 38, 40 undergo a compressing force under the load of the sheet 2, edges A of end portions of the guide slots 39 are caught on an upper surface of the horizontal support plate 60 and lower edges D of end portions of the horizontal support plate 60 are caught on lower surfaces of the guide slots 39 to prevent the bottom frames 38 and 40 from moving in the compressing direction.

In the embodiments illustrated in FIGS. 15 to 19, such non-slip mechanisms or engaging mechanisms as shown in FIGS. 9 to 14 may be provided between the guide slots 39, 39a and the bottom frame 40 or the support plate 60. Further, although in each of the above embodiments the bottom frames 38 and 40 are inclined downward, they may be inclined obliquely upward. In this case, when the pressing frame 3 is expanded, it assumes an inverted V shape, affording the same functions and effects as above.

The following effects are attained by the present invention.

(1) According to the invention since bottom portions of retaining frames are inserted into guide slots slidably, the retaining frames can be allowed to slide in both compressing direction and expanding direction through the guide slots and can normally be compressed in a compact shape, thus facilitating conveyance and storage. In using the retaining frames, the retaining frames are caused to slide transversely in the expanding direction by an urging member, so that a sheet is held grippingly by the retaining frames and an elongated support frame, thereby preventing sagging and wrinkling of the sheet and also preventing rupture of the sheet caused by rubbing.

(2) According to one aspect of the invention since a central support plate of a pressing frame reinforces the whole of the pressing frame, the retaining frames are prevented from being bent or warped even if a tension is exerted thereon from the sheet. Consequently, the work for installing and removing the pressing frame with respect to the elongated support frame is improved remarkably and so is the sheet fixing work, whereby the working efficiency is improved and the working cost can be reduced.

(3) According to one aspect of the invention since horizontal bottom portions of retaining frames of a pressing frame are fitted together through a guide slot or slots, the horizontal bottom portions reinforce the pressing frame, whereby bending and warping of each retaining frame are prevented and there can be attained the same effects as above.

(4) According to one aspect of the invention since bottom frames of a pressing frame are fitted together or a support plate is located centrally, the bottom frames or the support plate reinforces the whole of the pressing frame, and even when the tension from the sheet is exerted on the pressing frame in the compressing direction, both side frames are prevented from being bent or warped. Accordingly, the work for installing and removing the pressing frame with respect to the elongated support frame is improved remarkably and so is the sheet fixing work, with eventual improvement of the working efficiency and reduction of the working cost.

(5) According to one aspect of the invention since retaining frames of a pressing frame are formed at the same angle as both side wall portions of an elongated support frame and bottom frames of the pressing frame are inclined upward or downward, the pressing frame assumes a V shape when expanded in the transverse direction and tends to form a more acute V shape when it undergoes a force in the compressing direction from the sheet, whereby edges of end portions of the bottom frames are caught on each other to prevent the pressing frame from moving in the compressing direction, and thus the sheet can be maintained in a pinched state.

(6) According to one aspect of the invention, since a non-slip mechanism or an engaging mechanism is provided, compression of the pressing frame can be prevented more firmly. Besides, the pressing frame assumes a V shape when expanded, and in this state it combines with the elongated support frame into a rigid structure. Consequently, the sheet fixing device itself serves as a rigid framework in a vinyl house as a greenhouse.

What is claimed is:

1. A sheet fixing device comprising:

an elongated support frame having a narrow opening portion, said elongated support frame comprising a horizontal bottom portion and side wall portions rising respectively from side ends of said bottom portion;

a pressing frame fitted in said elongated support frame to hold a sheet grippingly in cooperation with the elongated support frame; and an urging member fitted in said pressing frame to urge the pressing frame against an inner wall of said elongated support frame, wherein said pressing frame comprises a central support plate, guide slots formed longitudinally in both side positions of said support plate, and a pair of right and left retaining frames having horizontal bottom portions fitted transversely slidably into said guide slots respectively.

2. A sheet fixing device comprising:

an elongaaated support frame (1) having a narrow opening portion, said elongated support frame comprising a horizontal bottom portion (1a) and a pair of side wall portions (1b) rising respectively from right and left sides of said bottom portion;

a pressing frame (3) fitted in said elongated support frame to hold a sheet grippingly in cooperation with athe elongated support frame; and an urging member (6) fitted in said pressing flame to urge the pressing frame against right and left inner walls of said elongated support frame, wherein said pressing frame is composed of a pair of separate right and left retaining frames (10), each retaining frame comprises a horizontal bottom portions (A, 9) and a retaining piece (B) rising from one end of the horizontal bottom portions (A, 9) along the side wall portion (1b) of said elongated support frome (1) and each horizontal bottom portion (A, 9) of respective retaining frames (10) are located transversely slidably along an upper surface of the horizontal bottom portion (1a) of the elongated support frame (A).

3. A sheet fixing device comprising:

an elongated support frame (1) defining a narrow opening portion, said elongated support frame including a middle portion (1*a*) and a pair of side wall portions (1*b*) rising respectively from opposite sides of said middle portion (1*a*);

a pressing frame (3) arranged in said elongated support frame (1) to hold a sheet (2) between said pressing frame 93) and said support frame (1), said pressing frame (3) including two retaining frames (10), each of said retaining frames (10) having a sliding portion (A, 9) adjacent said middle portion (1) of said support frame (1) and having a retaining piece (B) adjacent one of said side walls (1*b*), each said sliding portion (A, 9) being independently movable toward and away from said side walls (1*b*);

an urging member (6) arranged in said pressing flame to bias said pressing frame against said side walls of said elongated support frame.

* * * * *